United States Patent [19]

Takeuchi et al.

[11] Patent Number: 4,611,316
[45] Date of Patent: Sep. 9, 1986

[54] ACTUATOR OPERATING CENTER DETECTING CIRCUIT AND OPTICAL DISK APPARATUS WITH THE DETECTING CIRCUIT

[75] Inventors: Toyoaki Takeuchi; Ken Ohshima; Hideyuki Kenjyo; Yoshiaki Ikeda; Masaharu Sakamoto, all of Tokyo, Japan

[73] Assignee: Olympus Optical Co. Ltd., Tokyo, Japan

[21] Appl. No.: 561,654

[22] Filed: Dec. 15, 1983

[30] Foreign Application Priority Data

Dec. 23, 1982 [JP] Japan ................................ 57-232037

[51] Int. Cl.4 .............................................. G11B 7/00
[52] U.S. Cl. .................................................... 369/44
[58] Field of Search ................................ 369/43–44, 369/45, 46, 47, 48, 50, 51, 54, 111, 55; 250/201; 358/907

[56] References Cited

U.S. PATENT DOCUMENTS 4,352,981 10/1982 Sugiyama et al. ................ 369/45

Primary Examiner—Donald McElheny, Jr.
Attorney, Agent, or Firm—Frishauf, Holtz, Goodman & Woodward

[57] ABSTRACT

A detecting circuit for detecting an operating center of an actuator of an optical head includes a first comparator for comparing a tracking signal based on a reproduced signal coming from the optical head with a reference voltage approximate to zero voltage level, and a second comparator for comparing the tracking signal of which the DC component is removed with a second reference voltage approximate to zero voltage level. A level inversion of a binary output signal of the first comparator is detected at a level inverting point of a binary output signal of the second comparator. The operating center of the actuator is checked with the detection of the level inversion.

6 Claims, 2 Drawing Figures

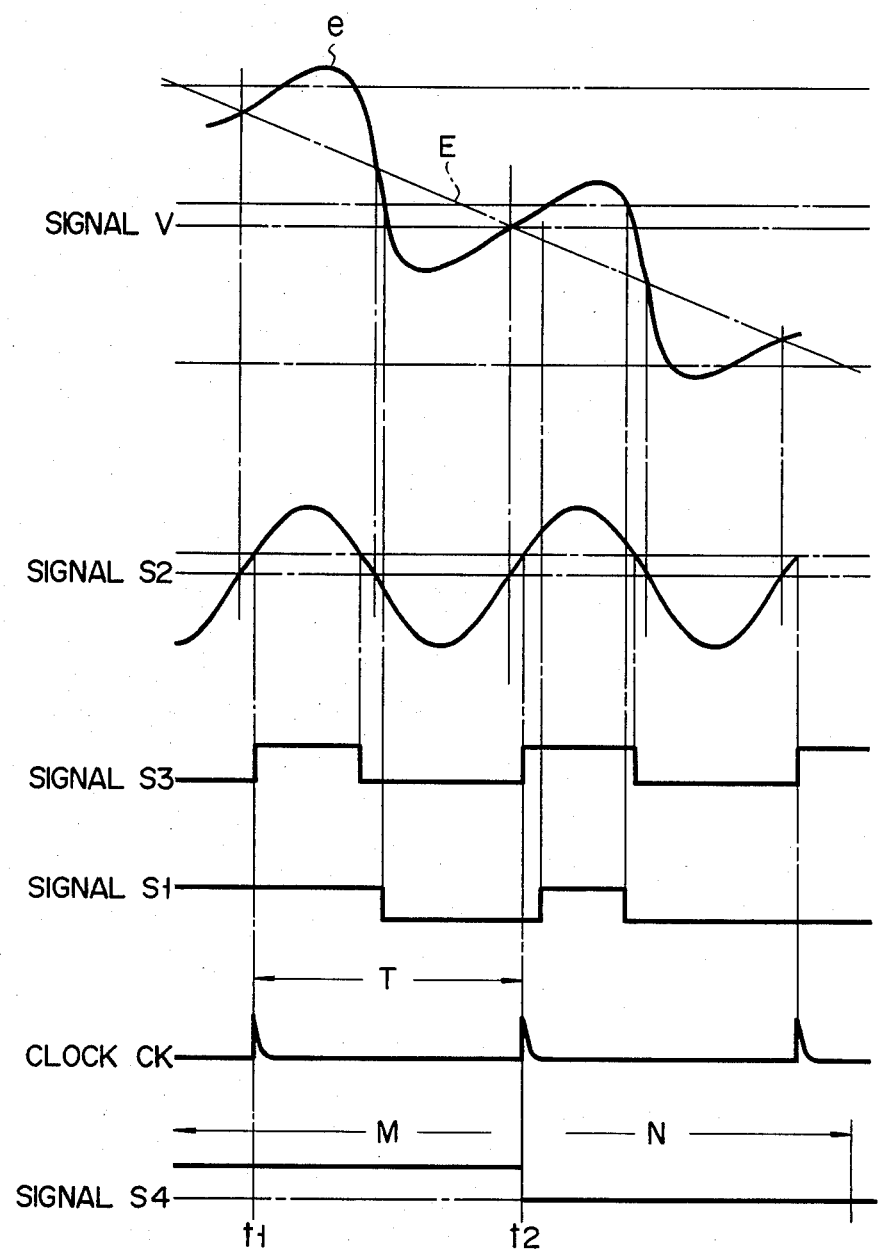

ACTUATOR OPERATING CENTER DETECTING CIRCUIT AND OPTICAL DISK APPARATUS WITH THE DETECTING CIRCUIT

BACKGROUND OF THE INVENTION

This invention relates to a circuit for detecting an operating center of an actuator of an optical head for optically recording and reproducing data to and from an optical disk, and to an optical disk apparatus with the actuator operating center detecting circuit.

When the optical disk apparatus reads out the data recorded on the optical disk, the pick-up head is subjected to a motion, such as track jump and access control. Even under the motion, the reproducing laser beam emitted from an optical pick-up head must exactly be landed on a desired track of the optical disk. In such tracking control, however, there is limited a control range in which an actuator to drive the objective lens system is stably moved. Therefore, if the direction and the motion amount of the optical head and the objective lend system are improper, an abberation is possibly caused in the optical system. The abberation caused creates an error in the read out signal. To avoid this, it is necessary to accurately detect the operating center position of the actuator. The tracking must be performed within a stable operating range of the actuator on the basis of the detected operating center position of the actuator.

SUMMARY OF THE INVENTION

An object of the present invention is to provide a circuit for exactly detecting an operating center position of an actuator of an optical head and an optical disk apparatus with such detecting circuit, which is able to stably perform the tracking.

A low frequency component of a tracking signal, when the tracking servo system is operating, represents a deviating amount of the present actuator position from a mechanical center of the actuator. The tracking signal contains a DC component representing the mean position, or the operating center position, of the actuator and a low frequency component of normally 10 Hz representing a deviation of an eccentric motion of the disk in synchronism with the rotation of the optical disk. An amount of the deviation of the actuator is obtained on the basis of the operating center position of the actuator and the eccentric amount of the disk. The deviation amount is obtained by removing the noise component from the tracking signal. The eccentric amount is obtained by removing the DC component from the tracking signal. The polarity of the DC component of the tracking signal is used for finding to which side of the operating center position the actuator is deviated.

To implement the above basic idea, a tracking error defector generates a tracking signal on the basis of a laser beam reflected from the optical disk. A first comparator compares the tracking signal from the tracking error detector with a reference voltage approximate to zero potential level. As the result of the comparison, the first comparator produces a binary signal as given by a level of the tracking signal relative to the reference voltage level. The tracking signal is supplied to a DC cut-off circuit. The DC component of the tracking signal is removed by the DC cut-off circuit. A second comparator compares the tracking signal containing only the AC component output from the DC cut-off circuit with another reference voltage approximate to a zero voltage level by a second comparator. The second comparator then produces a binary signal as given by a level of the AC component of the tracking signal relative to the reference voltage. A level inversion detecting circuit detects a level inversion of the output signal of the first comparator as the output signal of the second comparator is level inverted. On the basis of the detection result, an operating point of the actuator is detected. The tracking signal is supplied to a window comparator with a level range corresponding to a stable operating range of the actuator. The window comparator judges as to whether or not the tracking signal level falls within the range over which the actuator can respond. The tracking actuator or the optical head driver is driven on the basis of the outputs of the window comparator and the judging circuit.

BRIEF DESCRIPTION OF THE DRAWINGS

FIG. 2 is a set of waveforms useful in explaining the operation of the apparatus.

DETAILED DESCRIPTION OF THE PREFERRED EMBODIMENT

Figure 1:
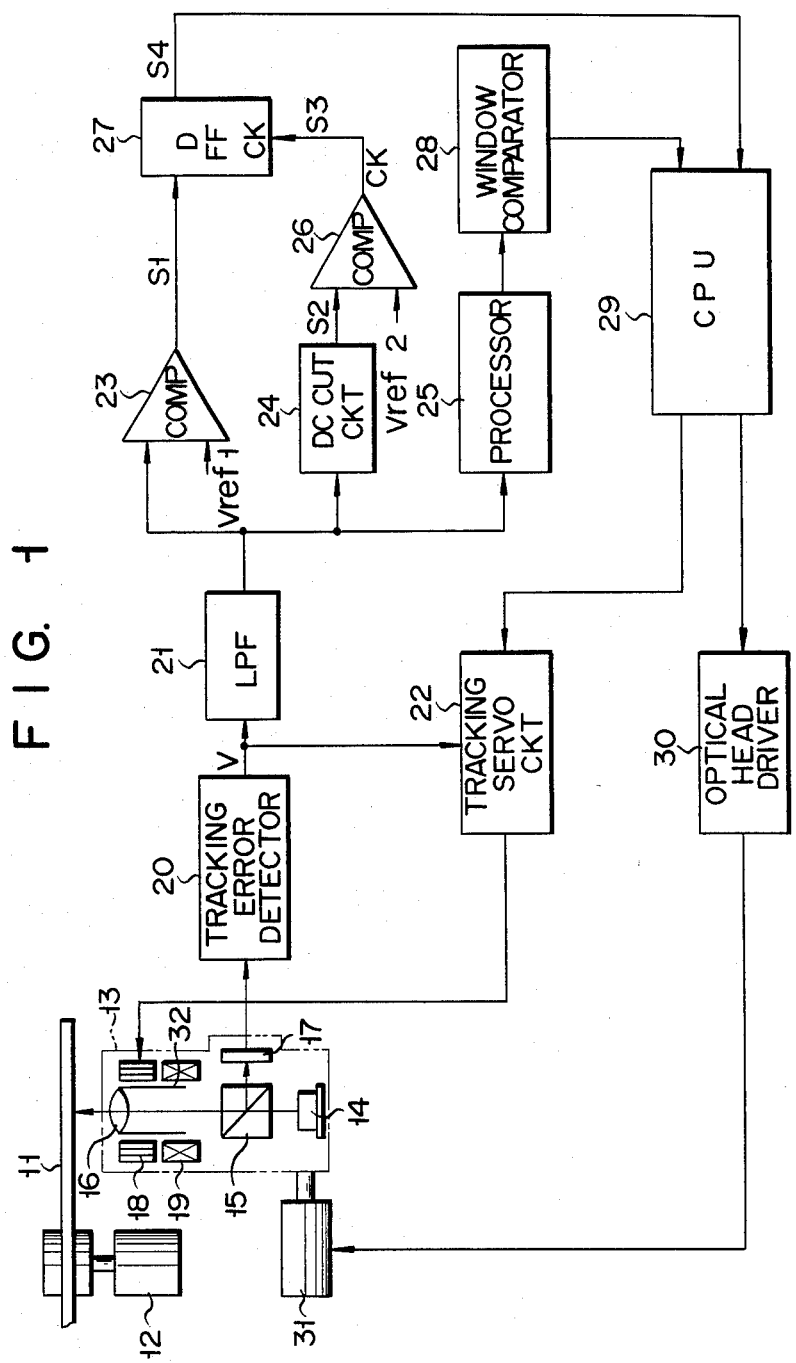
FIG. 1 is a block diagram of an embodiment of an optical head apparatus with an actuator operating center detecting circuit according to the present invention.

In FIG. 1, an optical disk 11 is driven for rotation by a motor 12. An optical head 13 is disposed facing the optical disk 11. The optical head 13 contains a semiconductor laser 14, a beam splitter 15, and an objective lens 16, which are arranged on an optical axis. A photosensor 17 is disposed on the side of the beam splitter 15. A tracking coil 18 and a focussing coil 19 are disposed adjacent to the objective lens 16.

The output of the photosensor 17 is connected to an input terminal of a tracking error detector 20. The output terminal of the tracking error detector 20 is connected to the low pass filter 21 and the tracking servo circuit 22. The output terminal of the low pass filter 21 connected to a first input terminal of a first comparator 23, a DC cut-off circuit 24 and an input terminal of a processor 25. A second input terminal of the comparator 23 is connected to a reference voltage (Vref1) source. The output terminal of the DC cut-off circuit 24 is connected to a first input terminal of a second comparator 26. A second input terminal of the second comparator 26 is connected to a reference voltage (Vref2) source. The first and second comparators 23 and 26 are respectively connected to the D and CK terminals of a flip-flop circuit 27. The output terminal of the processor 25 is connected to the input terminal of a window comparator 28. The output terminals of the flip-flop circuit 27 and the window comparator 28 are connected to a CPU 29 as a controller. The output port of the CPU 29 is connected to the input terminals of the tracking servo circuit 22 and the optical head driver 30. The output terminal of the tracking servo circuit 22 is connected to the optical head 13. The output terminal of an optical head driver 30 is connected to an optical head drive motor 31.

In operation, the optical disk 11 is rotated by the motor 12, and the semiconductor laser 14 emits a laser beam. Then, the photosensor 17 produces a tracking signal. The photosensor 17 contains two photosensing segments symmetrically separated with respect to an optical axis. When the laser beam spot lands on the photosensing segments correctly or symmetrically with respect to the optical axis, the tracking by an actuator, or the head 13, is correct. Under this condition, the signal levels of the photosensing segments are equal to each other. If the landing position of the beam spot is deviated from the correct one, the signal levels of the photosensing segments are not equal to each other. The tracking error detector 20 calculates the difference of the two output signals of the photosensor 17 to produce a tracking error signal. The tracking error signal is produced in the form of a voltage signal V, as shown in FIG. 2. The voltage signal V is composed of increasing and decreasing components E of a DC voltage when the actuator 32 for driving the objective lens 16 in the optical head 13 along a spiral recording track on the optical disk 11 is radially deviated and a ripple component C when the optical disk 11 is eccentrically shifted. The voltage signal V is applied to the low pass filter 21 where a noise component therein is removed. Then, it is connected to the first comparator 23, the DC cut-off circuit 24 and the processor 25. The first comparator 23 compares the voltage signal V with a reference voltage Vref1 approximate to a zero voltage level. On the basis of the comparison, the first comparator 23 produces a binary signal S1 as given by a level, or an amplitude, of the voltage signal V relative to that of the reference voltage Vref1. The signal S1 is applied to the flip-flop circuit 27, and further to the DC cut-off circuit 24. The nc cut-off circuit 24 removes the DC component E from the voltage signal V. A signal S2 containing only the ripple component e, output from the DC cut-off circuit 24, is supplied to the second comparator 26. Similarly, the second comparator 26 compares the signal S2 with another reference voltage Vref2 approximate to zero, and produces a binary signal S3 representing a level of the signal S2 relative to that of the reference voltage Vref2. The binary signal S3 is applied to the CK terminal of the flip-flop circuit 27. Preferably, the binary signal S3, after it is differentiated at the leading edge, is applied as a clock CK to the flip-flop circuit 27. The flip-flop circuit 27 inverts its output logical state in response to the clock CK applied thereto when the output signal S1 of the first comparator 23 is low in logical state. For example, the output logical level of the flip-flop circuit 27 is not inverted even if it is applied with a clock CK from the second comparator 26 at time point t1 where the operating center of the actuator 32 lies at a point M located somewhat inside the mechanical center and the output signal of the first comparator 23 is high in logical level. When the operating center of the actuator 32 shifts to a point N somewhat outside the mechanical center, the output of the first comparator 23 becomes low in logical level. Under this condition, viz. at time point t2 and the subsequent ones, the flip-flop circuit 27 inverts the output logical state in response to a clock applied thereto. Thus, the flip-flop circuit 27 judges the inversion of the signal level of the signal S1 derived from the first comparator 23 at the leading edge of the output signal S3 of the second comparator 26.

The processor 25 arithmetically processes the voltage signal V applied through the low pass filter 21 and converts it into a current signal. The current signal is in turn supplied, as the position data of the actuator 32, to the window comparator 28. The window comparator 28 judges whether or not the actuator position data is within a tracking range over which the actuator 32 can respond, and produces a signal representing the result of the judgement to the CPU 29. The CPU 29 judges whether the actuator 32 or the optical head drive motor 31 is driven on the basis of the signal S4 of the flip-flop circuit 27 and the signal of the window comparator 28, and correspondingly produces a tracking command signal or an optical head drive command signal. If the tracking command signal is produced and applied to the tracking servo circuit 22, the tracking servo circuit 22 applies to the tracking coil 18 the tracking servo signal representing the output signal V of the tracking error detector 20, thereby to effect the tracking. If the CPU 29 applies the optical head drive command signal to the optical head driver 30, the optical head driver 30 responds to this signal to drive the optical head drive motor 31. The optical head 13, when driven, moves in the radial direction of the optical disk 11.

As described above, the first and second comparators compare respectively the tracking signal containing the DC component and the tracking signal of which the DC component is removed with the first and second binary signals. Then, those comparators respectively produce first and second binary signals representing the results of the comparisons. The level inversion of the first binary signal of the first comparator is detected at the level inverting point of the second binary signal of the second comparator. An actuator position corresponding to the inversion detecting point is judged as an operating center point. With such an arrangement, the operating center of the actuator can simply and exactly be detected, providing a stable and reliable tracking of the actuator, more exactly the optical head.

In the above embodiment, a push-pull method is used to detect a tracking error. This method may be replaced by the other conventional tracking error detecting methods.

What is claimed is:

1. A detecting circuit for detecting an operating center of an actuator of an optical head comprising:
   tracking signal generating means for generating a tracking signal on the basis of data read out from an optical disk by an optical head having an actuator for effecting the tracking;
   first comparator means for comparing the tracking signal from said tracking signal generating means with a first reference voltage approximate to zero voltage level, to produce a binary signal as given by a level of the tracking signal relative to that of the first reference voltage;
   DC cut-off means for cutting off a DC component of the tracking signal to provide the tracking signal containing only an AC component;
   second comparator means for comparing the output signal of said DC cut-off means with a second reference voltage approximate to zero voltage level, to provide a second binary signal as given by a level of the output signal of said DC cut-off means relative to the second reference voltage;
   level inversion detecting means for detecting a level inversion of the first binary signal of said first comparator means at a level inverting point of the second binary signal of said second comparator means; and
   means for checking an operating center of the actuator of said optical head with the detection of the level inversion.

2. The detecting circuit according to claim 1, wherein said level inversion means comprises a D type flip-flop having a D (data) input terminal and a CK (clock) input terminal, said first binary signal of said first comparator means being coupled to said D input terminal, said second binary signal of said second comparator means being coupled to said CK input terminal.

3. The detecting circuit according to claim 1, wherein:
 said optical head comprises a photosensor including two photosensing elements for producing respective signals; and
 said tracking signal generating means comprises a tracking error detector for obtaining a tracking error from the level difference of the signals of said two photosensing elements to produce a tracking error signal, and a low pass filter for removing a noise component from the produced tracking error signal.

4. An optical disk apparatus comprising:
 optical head means having an actuator for effecting tracking;
 a detecting circuit for detecting an operating center of the actuator of the optical head means, said detecting circuit including tracking signal generating means for generating a tracking signal on the basis of data read out from an optical disk by said optical head means, first comparator means for comparing the tracking signal from said tracking signal generating means with a first reference voltage approximate to zero voltage level to produce a binary signal as given by a level of the tracking signal relative to that of the first reference voltage, DC cut-off means for cutting off a DC component of the tracking signal to provide the tracking signal containing only an AC component, second comparator means for comparing the output signal of said DC cut-off means with a second reference voltage approximate to zero voltage lever to provide a second binary signal as given by a level of the output signal of said DC cut-off means relative to the second reference voltage, level inversion detecting means for detecting a level inversion of the first binary signal of said first comparator means at a level inverting point of the second binary signal of said second comparator means, said level inversion detecting means having an output which is the output of said actuator operating center detecting circuit, and means for checking an operating center of the actuator of said optical head means with the detection of the level inversion;
 judging means responsive to a signal corresponding to said tracking signal from said tracking signal generating means for judging a stable operating range of said actuator on the basis of the tracking signal, and for producing a judgment output;
 means coupled to said judging means for selectively producing a tracking drive signal and an optical head drive signal as a function of the output signals of said actuator operating center detecting circuit and the output of said judging means;
 tracking means for driving said actuator according to the tracking drive signal; and
 means for driving said optical head means in the radial direction of said optical disk according to said optical head drive signal.

5. The optical disk apparatus according to claim 4, wherein said level inversion detecting means comprises a D type flip-flop having a D (data) input terminal and a CK (clock) input terminal, said connected to a data input of the first binary signal of said first comparator means being coupled to said D input terminal and said second binary signal of said second comparator means being coupled to said CK input terminal.

6. The optical disk apparatus according to claim 4, in which said operating range judging means includes means for computing an actuator position using the tracking signal to produce an actuator position signal, and a window comparator for comparing an actuator position signal of said actuator position signal output means with a level range corresponding to an actuator stable operating range.

* * * * *